United States Patent [19]

Leven et al.

[11] Patent Number: 5,480,599
[45] Date of Patent: Jan. 2, 1996

[54] METHOD OF MANUFACTURING FOAM BEADS

[75] Inventors: Thomas Leven, Lüdenscheid; Michael Träger, Haltern; Horst Perl, Marl, all of Germany

[73] Assignee: Huels Aktiengesellschaft, Marl, Germany

[21] Appl. No.: 289,546

[22] Filed: Aug. 12, 1994

Related U.S. Application Data

[63] Continuation of Ser. No. 35,192, Mar. 22, 1993, abandoned.

[30] Foreign Application Priority Data

Apr. 9, 1992 [DE] Germany .................... 42 11 972.3

[51] Int. Cl.⁶ .................................................. C08J 9/228
[52] U.S. Cl. .................................. 264/53; 264/51; 521/56; 521/60
[58] Field of Search .................. 264/51, 53, DIG. 9; 521/56, 60

[56] References Cited

U.S. PATENT DOCUMENTS

| | | | |
|---|---|---|---|
| 2,829,177 | 4/1958 | Lindemann . | |
| 2,929,106 | 3/1960 | Snow | 521/56 |
| 3,086,885 | 4/1963 | John | 521/56 |
| 3,089,857 | 5/1963 | Pottenger | 521/60 |
| 3,577,360 | 5/1971 | Immel | 521/56 |
| 3,914,360 | 10/1975 | Gunderman et al. | 264/51 |
| 3,953,558 | 4/1976 | Hatano et al. | 521/56 |
| 4,379,859 | 4/1983 | Hirosawa et al. | 521/60 |
| 4,448,901 | 5/1984 | Senda et al. | 521/56 |
| 4,513,106 | 4/1985 | Edgren et al. | 264/53 |
| 4,560,705 | 12/1985 | Harrison | 521/56 |
| 4,602,047 | 7/1986 | Endo et al. | 521/56 |
| 4,622,346 | 11/1986 | DiGiulio | 521/60 |
| 4,627,947 | 12/1986 | Voss | 521/60 |
| 4,810,440 | 3/1989 | Yoshida et al. | 521/56 |
| 5,122,545 | 6/1992 | Kuwabara et al. | 521/56 |

FOREIGN PATENT DOCUMENTS

| | | | |
|---|---|---|---|
| 0164855 | 12/1985 | European Pat. Off. . | |
| 0467551 | 1/1992 | European Pat. Off. . | |
| 3524830 | 1/1986 | Germany . | |
| 60-219015 | 11/1985 | Japan | 521/56 |
| 62-018438 | 1/1987 | Japan | 521/56 |
| 4057838 | 2/1992 | Japan | 521/56 |
| 276067 | 10/1964 | Netherlands . | |
| WO91/16970 | 11/1991 | WIPO . | |

OTHER PUBLICATIONS

Database WPIL, Derwent Publications Ltd., AN 85–253499, JP–A–60 168 610, Sep. 2, 1985.

*Primary Examiner*—Allan R. Kuhns
*Attorney, Agent, or Firm*—Oblon, Spivak, McClelland, Maier, & Neustadt

[57] ABSTRACT

A continuous process for manufacturing foam beads using a simple apparatus, wherein the expansion agent can be easily recycled. Polymer particles and a dispersing medium are fed continuously to an unstirred mass transfer column having a high length to diameter ratio which is operated under pressure. The polymer particles and dispersing medium are subjected to thermal processing under pressure in the mass transfer column, and the resulting dispersion is sprayed into a low pressure space causing the polymer particles to expand. Accordingly, foam beads of constant quality and a uniform cell diameter and a uniform degree of expansion are manufactured without costly process means.

19 Claims, 1 Drawing Sheet

METHOD OF MANUFACTURING FOAM BEADS

This application is a Continuation of application Ser. No. 08/035,192, filed on Mar. 22, 1993, now abandoned.

BACKGROUND OF THE INVENTION

1. Field of the Invention

The present invention relates to a continuous method for manufacturing foam beads from polymers.

2. Discussion of the Background

Various methods of manufacturing foam beads are known. European EP-A-0 053 333 discloses dispersing polymer particles held together with a volatile expansion agent and a dispersant in water in a closed heated vessel. Once the dispersion is heated to a point above the softening point of the polymer, the polymer particles become impregnated with the expansion agent. Then, while maintaining the pressure in the vessel, one end of the vessel is opened and the contents are sprayed out into a low pressure atmosphere causing the polymer particles to expand into a foam. A similar method employing filler-containing polymer particles and dispensing with a volatile expansion agent is disclosed in German DE-OS 21 55 775. However, both of these methods are discontinuous and provide only relatively low production capacity because substantial time must be consumed in rinsing, filling, and heating. In addition, it is difficult in a discontinuous process to achieve a uniform product quality. Japanese Patent JP-A-59-067,022 describes a continuous method of manufacturing foam beads wherein thermal processing is carried out stagewise in six stirred reactors. A slurry comprising a polymer and dispersing medium is passed through each reactor and is de-pressurized in a low pressure space. One of the six reactors is required for adding the gaseous expansion agent and one is required for expelling the dispersion. The pressure in the dispersion expelling vessel is higher than in the vessels in which thermal processing is carried out. All of the vessels must be designed to be suitably pressure resistant, which results in high apparatus cost. The number of stirred heated vessels, pumps, and auxiliary equipment renders the system uneconomical from an equipment cost standpoint.

According to the state of the art, polymer particles are impregnated with a volatile expansion agent during thermal processing. Typical expansion agents include hydrocarbons such as propane, butane, pentane, hexane, and heptane, alicyclic hydrocarbons such as cyclopentane and cyclohexane, halogenated hydrocarbons such as trichlorofluoromethane, dichlorodifluoromethane, dichlorotetrafluoroethane, dichlorofluoromethane, trichlorotrifluoroethane, methyl chloride, ethyl chloride, and dichloromethane, and in certain cases inorganic gases such as carbon dioxide and nitrogen. These expansion agents are dissolved by the polymer particles under pressure, and are liberated into the low pressure space during expansion. It is desirable for economic, environmental, and safety reasons for the liberated expansion agent to be recovered and recycled after the expansion. However, this can be accomplished only at great expense for a discontinuous process as described in European EP-A-0 140 059. In European EP-A-0 140 059, a liquid-filled gasometer is used to store the liberated gas until the gas can be reused for a new reaction mixture. In the case of a high boiling expansion agent, the agent is condensed and stored for the interim in liquid form.

A common feature of all discontinuous processes for manufacturing foam beads is that as the dispersion is passed out of the pressure vessel, the pressure in the vessel is lowered by increasing the gas space in the vessel. Accordingly, there is a continuous decrease in the degree of expansion of the expelled particles. As described in European EP-A-0 095 109, this problem can be solved only by continuously adding expansion agent during the expansion so as to maintain the partial pressure of the expansion agent. Another feature which is important in establishing high quality foam is the use of nozzles having one or more openings, wherewith the openings have a specific diameter. European EP-A-0 234 320 requires the use of nozzles wherein the ratio of the length to opening diameter of the nozzle is in the range 4–100. Otherwise foam beads with nonuniform cell diameters and degrees of expansion are obtained.

SUMMARY OF THE INVENTION

Accordingly, one object of the present invention is to provide a continuous method of manufacturing foam beads utilizing a simple and inexpensive apparatus which is capable of recycling the expansion agent without using large-volume containers or condensers, and wherein the foam beads have a uniform cell diameter and a uniform degree of expansion.

This problem is solved by continuously feeding polymer particles and a dispersing medium into an unstirred mass transfer column having a high length to diameter ratio and operated under pressure, subjecting the dispersion of said polymer particles in said dispersing medium to thermal processing under pressure in said column and spraying the formed dispersion into a low pressure space wherein the dispersion is depressurized causing the polymer particles to expand.

BRIEF DESCRIPTION OF THE FIGURE

A more complete appreciation of the invention and many of the attendant advantages thereof will be readily obtained as the same becomes better understood by reference to the following detailed description when considered in connection with the accompanying drawing, wherein.

DETAILED DESCRIPTION OF THE PREFERRED EMBODIMENTS

Figure 1:
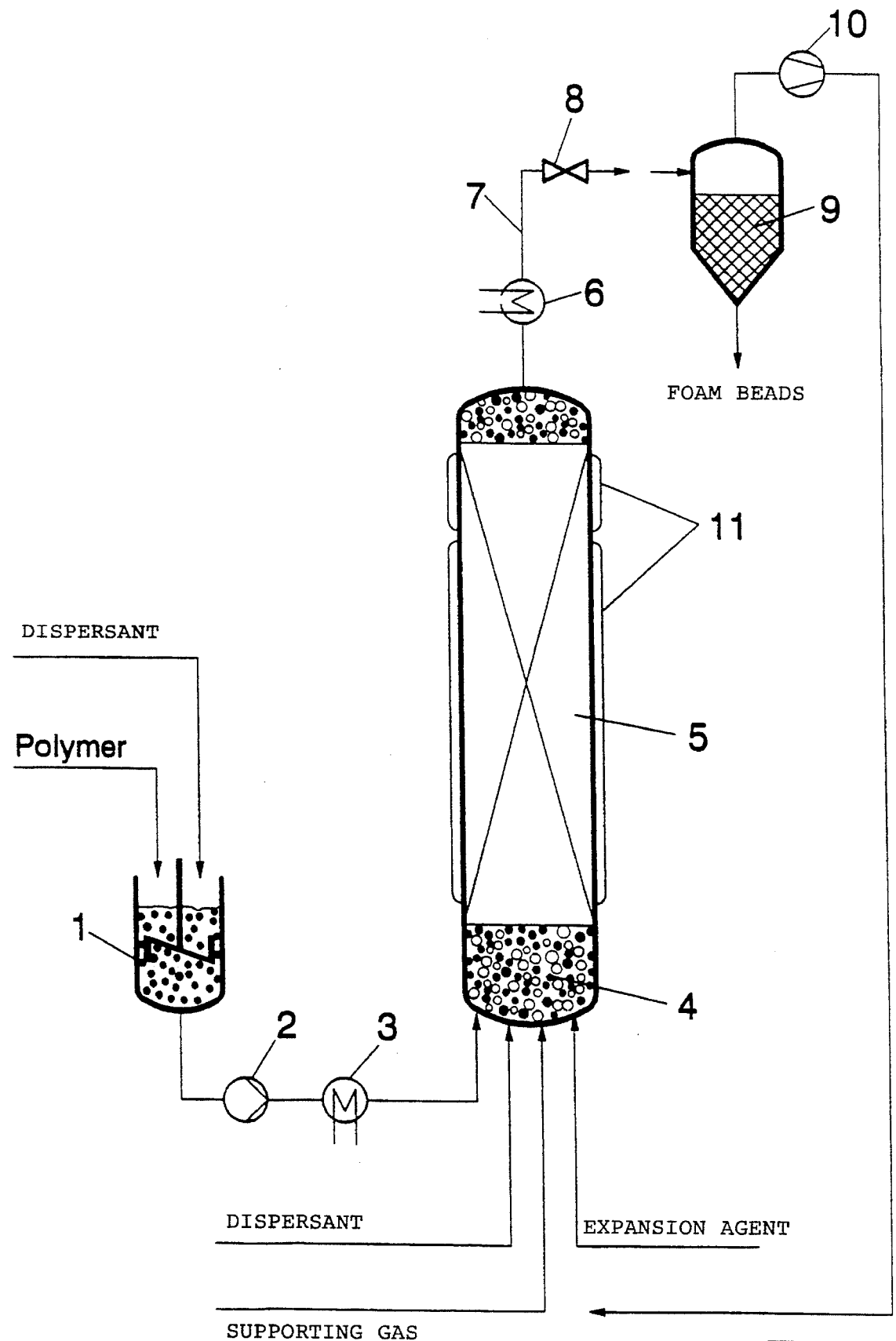
FIG. 1 schematically describes a process for continuously producing polymer foam beads.

Referring now to the drawing of FIG. 1, a dispersion in the form of a slurry of polymer material in a dispersing medium is produced in a heated vessel 1, and is fed continuously with the aid of a pump 2 into a mass transfer column 4. The column is operated at a pressure greater than or equal to the vapor pressure of the dispersing medium, and at a temperature above the softening point of the polymer (measured according to ASTM D 648, with load 4.6 kg/sq mm). The upper temperature limit is determined by requiring that the polymer particles not be softened so much that they aggregate and thereby plug up the apparatus. For a given polymer, persons skilled in the art relating to the corresponding discontinuous method will be familiar with this upper limit. The operating temperature may be maintained either by heat exchanger 3 and/or by heating jacket 11. Preferably, heating jacket 11 is a double jacket in which the temperature is maintained by a liquid or vapor. The pressure in the mass transfer column is generally 100 bar or less. However, higher pressures are possible with appropriate system design. Ordinarily, the operating pressure is in the range 5–50 bar.

After passing through the mass transfer column, the dispersion may be adjusted to a final temperature using heat exchanger 6, and is then expanded through a throttle device 8 causing the polymer particles to expand into a foam.

Examples of polymers which may be used in the context of the invention include polystyrene, poly-α-methylstyrene, copolymers of styrene and maleic anhydride or maleic acid imides, blends or graft copolymers of polyphenylene oxide and polystyrene, copolymers of acrylonitrile and styrene, terpolymers of acrylonitrile, butadiene, and styrene, copolymers of styrene and butadiene, high impact polystyrene, polyvinyl chloride, copolymers of vinyl chloride and vinyl acetate, chlorinated polyvinyl chloride, polyamides, polyesters, and polyolefins.

Suitable polyolefins include propylene polymers such as propylene-ethylene random copolymers or propylenebutylene random copolymers, random terpolymers of ethylene, propylene, and 1-butene, ethylene-propylene block copolymers, and homopolypropylene; ethylene polymers such as low, medium, or high density polyethylene, low density linear polyethylene, ethylene-vinyl acetate copolymer, ethylene-methyl methacrylate copolymer, ionomers; and other polyolefins such as poly(1-butene).

These polymers are present as discrete particles. Preferably they have a mean particle diameter of 0.5–5 mm. In order to achieve uniform expansion, they may contain a filler known in the art which acts as a nucleating agent.

The preferred dispersing medium is water. However, alcohols such as methanol or ethanol are suitable as a dispersing medium.

Similar to the discontinuous process, a fine-particulate dispersant and/or surfactant is added to the slurry of polymer particles in the dispersing medium. Examples include calcium phosphate, basic magnesium carbonate, basic zinc carbonate, calcium carbonate, aluminum oxide, barium sulfate, talc, alkyl benzenesulfonates, paraffinsulfonates, or ethoxylates.

The solids content of the slurry should be between 1 and 60 wt. %. Preferably, the solids content of the slurry is between 20 and 35 wt. %.

The polymer particles and the dispersing medium may be fed continuously into the column in separate streams.

The mass transfer column has a length to diameter ratio of 3–60. Preferably, the length to diameter ratio is 5–40. Most preferably, the length to diameter ratio is 9–25.

In order to obtain foam beads having uniform quality and consistency, the duration of thermal processing of all of the polymer particles must be uniform. A uniform residence time of all of the polymer particles can be achieved if the column is provided with baffles 5. Compared with a column without baffles, uniform bead quality is achieved at a much lower throughput rate of the slurry, which ultimately allows a shorter column. The baffles may be comprised of metal deflecting plates which are welded-on and which occupy 80% or less of the cross section of the column and are disposed in staggered fashion at distances of at least 0.1 and at most 10 times the diameter. The baffles may be ordinary commercially available elements such as the so-called "static mixers" (e.g., Sulzer SMV or SMX, or Kenics-Mixer). The length of a zone of the baffles should be at least twice the diameter of the column. The proportion of lengths of zones having baffles to the overall length of the column should be at least 0.2.

A supporting gas is fed via nozzles in the bottom region of the column. Apparently, a particularly narrow residence time distribution and uniform foam quality is achieved by the turbulent agitation of the column contents by means of gas bubbles. The supporting gas may comprise inert gases such as nitrogen, noble gases, or vapor of the dispersing medium. However, the gas throughput at the thermal processing temperature and pressure should not exceed 0.1 cu m/sec per sq m of column cross section. The best results are achieved at 0.004–0.03 cu m/sec/sq m.

For adjusting the density of the foam beads, it may be advantageous to additionally feed a volatile expansion agent to the mass transfer column. Suitable expansion agents are known from the discontinuous methods of the state of the art. Examples include saturated aliphatic hydrocarbons, such as ethane, propane, n-butane, isobutane, pentane, or hexane; alicyclic hydrocarbons, such as cyclopentane or cyclohexane; halogenated hydrocarbons, such as trichlorofluoromethane, dichlorodifluoromethane, dichlorotetrafluoroethane, trichlorotrifluoroethane, dichlorofluoromethane, methyl chloride, dichloromethane, or ethyl chloride; or inorganic gases, such as carbon dioxide; or mixtures of these. If fed in sufficient quantity, a gaseous expansion agent may also serve as the supporting gas. The expansion agent may be fed to the column either separately from or together with the supporting gas.

If no volatile expansion agent is added, then only the dispersing medium serves as the expansion agent which results in only moderate degrees of expansion. However, for numerous applications, e.g. when a relatively stiff foam is desired, this condition is desirable.

It may be desired to adjust the final temperature before expulsion of the dispersion in order to influence foam quality. Accordingly, the temperature may be established in the upper part of the mass transfer column by means of a separate double jacket, or directly in the expulsion line by means of a heat exchanger 6. In order to achieve a uniform cell size in the foam beads, it is advantageous for the heat exchanger 6 to be followed by a thermally insulated length of line 7 the cross section of which is at least three times that of the heat exchanger and the length of which is at least twice that of the heat exchanger.

As the throttle device 8, a simple single-orifice plate or nozzle may be used. However, to achieve a pressure-independent expulsion rate of the polymer particles it is advantageous to use a controllable valve. It has been found that the quality of the foam beads does not depend on the expulsion rate if a preexpansion chamber is provided in the valve upstream of the vena contracta, which chamber consists of a widened region of the flow channel in the valve, resulting in a volume which produces a residence time of the expanding material of greater than 0.1 msec, and preferably greater than 0.5 msec. With this particular throttle device, the throughput through the mass transfer column, and the capacity of the installation, can be adjusted to operating requirements. Also, the reactor pressure can be selected without regard to the throughput which is not an option with ordinary nozzles.

The dispersion is sprayed into the low pressure space 9 via the throttle device 8, wherewith the polymer particles are expanded to a foam. Any expansion agent used, or at least a very large proportion of such agent, is continuously liberated. This provides the opportunity to recycle the volatile expansion agent and the supporting gas, for economic and environmental reasons. For this purpose, suction may be applied to the low pressure space with the aid of a compressor 10. Following suitable compression, these auxiliary agents may be recycled to the continuously operated mass transfer column, which serves to substantially simplify the process. In particular, costly storage containers are not required.

The foamed polymer particles may then be washed, in order to remove the dispersant, and dried in a manner known in the art.

The degree of expansion achieved in this process for polyolefins is generally in the range 4–15 for water expansion. The corresponding expansion achieved for volatile organic expansion agent is generally between 4 and 40.

The foamed polymer particles may be processed to form molded products using known techniques. Typically, polymer foam is softened and/or melted under a pressure of 1–5 bar in the presence of steam causing individual foam particles to melt together to form a molded article.

The inventive process has a number of advantages over the state of the art. The continuous method of operation enables much higher productivity because rinsing, filling, and heating times are obviated. Furthermore, the improved adaptability of the continuous method to automation provides more constant product quality compared with batch processes. Because the mass transfer column requires no additional equipment to agitate the slurry, the process consumes less energy. Because the column is long and narrow, it is less costly to produce as a pressure-safe vessel compared with a stirred reactor-type vessel. In contrast to a stagewise process comprising a plurality of reactors, the continuous method according to the invention utilizes only one mass transfer column. Because of the relatively small number of mechanically driven parts in the continuous method, the costs relating to investment, monitoring, and maintenance are all much less.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A method for manufacturing foam polymer beads comprising:
   i) continuously feeding polymer particles and a dispersing medium into an unstirred mass transfer column having a length to diameter ratio of from 3 to 60 and operating under pressure;
   ii) subjecting a dispersion of said polymer particles and said dispersing medium to thermal processing under pressure in said column, said dispersing medium also serving as an expansion agent; and
   iii) spraying the formed dispersion into a low pressure space, wherein said dispersion is depressurized, causing expansion of said polymer particles by expansion of said dispersing medium associated with said polymer particles.

2. The method according to claim 1, wherein the mass transfer column has a length to diameter ratio of 3–60.

3. The method according to claim 1, wherein the mass transfer column has a length to diameter ratio of 5–40.

4. The method according to claim 1, wherein the mass transfer column has a length to diameter ratio of 9–25.

5. The method according to claim 1, wherein the mass transfer column contains baffles disposed in staggered fashion at a separation distance of at least 0.1 and at most 10 times the diameter of the column, and said baffles cover at most 80% of the tubular cross section of the column.

6. The method according to claim 1, wherein the mass transfer column contains static mixers.

7. The method according to claims 5 or 6, wherein the length of a zone of the baffles is at least twice the diameter of the column, and the proportion of lengths of zones having baffles to the overall length of the column is at least 0.2.

8. The method according to claim 1, wherein a supporting gas is introduced via nozzle means in the bottom region of the column having a throughput less than or equal to 0.1 cu m/sec per sq m of cross section of the mass transfer column.

9. The method according to claim 8, wherein the supporting gas has a throughout in the range 0.004–0.03 cu m/sec/sq. m of cross section of the mass transfer column.

10. The method according to claim 1, wherein a volatile expansion agent is charged to the mass transfer column.

11. The method according to claim 1, wherein the dispersion is depressurized via a controllable valve.

12. The method according to claim 11, wherein a pre-expansion chamber is provided in the valve upstream of a vena contracta, which chamber consists of a widened region of the flow channel in the valve, resulting in a volume which produces a residence time in the pre-expansion chamber of the expanding material of greater than 0.1 msec.

13. The method according to claim 12, wherein the residence time of the expanding material is greater than 0.5 msec.

14. The method according to claim 1, wherein gaseous components present in the low pressure space are sucked off via a compressor and are returned to the mass transfer column.

15. The method according to claim 1, wherein said polymer particles include particles selected from the group consisting of propylene polymers, ethylene polymers, and poly(1-butene) polymers.

16. The method according to claim 1, wherein said polymer particles include particles made of polymers selected from the group consisting of propylene-ethylene random copolymers, propylene-butylene random copolymers, random terpolymers of ethylene, propylene, and 1-butene, ethylene-propylene block copolymers, homopolypropylene, low, medium, or high density polyethylene, low density linear polyethylene, ethylene-vinylacetate copolymer, ethylene-methyl methacrylate copolymer, ionomers, and poly(1-butene).

17. The method according to claim 1, wherein the polymer particles are discreet particles having a mean particle diameter of 0.5–5 mm.

18. The method according to claim 1, wherein no volatile expansion agent is added.

19. The method of claim 1, further comprising feeding a volatile expansion agent into said unstirred mass transfer column, wherein said thermal processing results in impregnation of said volatile expansion agent into said polymer particles.

* * * * *